United States Patent [19]
Rivet

[11] Patent Number: 5,828,562
[45] Date of Patent: Oct. 27, 1998

[54] DOUBLE DISCHARGE CIRCUIT FOR IMPROVING THE POWER FACTOR

[75] Inventor: Bertrand Rivet, Tours, France

[73] Assignee: SGS-Thomson Microelectronics S.A., Saint Genis, France

[21] Appl. No.: 825,191

[22] Filed: Mar. 27, 1997

[30] Foreign Application Priority Data

Mar. 29, 1996 [FR] France ................................... 96 04270

[51] Int. Cl.$^6$ ...................................................... H02M 7/06
[52] U.S. Cl. ........................... 363/125; 363/126; 320/166
[58] Field of Search ............................ 363/59, 61, 62, 363/84, 81, 125, 126, 74; 320/166, 167

[56] References Cited

U.S. PATENT DOCUMENTS

| | | | |
|---|---|---|---|
| 4,432,034 | 2/1984 | Wohlert et al. | 361/154 |
| 4,801,887 | 1/1989 | Wegener | 328/26 |
| 4,926,354 | 5/1990 | Pattantyus | 363/98 |
| 5,581,454 | 12/1996 | Collins | 363/59 |
| 5,646,502 | 7/1997 | Johnson | 320/5 |

FOREIGN PATENT DOCUMENTS

| | | | |
|---|---|---|---|
| A-0 600 809 | 6/1994 | European Pat. Off. | H02J 3/01 |
| A-2 228 042 | 1/1974 | Germany | H02J 3/18 |

OTHER PUBLICATIONS

Proceedings of the Annual Applied Power Electronics Conference and Exposition, (APEC), Los Angeles, Mar. 11–16, 1990, no. CONF, 5, Mar. 11, 1990, Institute Of Electrical And Electronics Engineers, pp. 672–680, Ghiara T., et al., "High Power Factor Control System in Multilevel Converters For AC Heavy Traction Drives".

I.E.E. Proceedings: Generation, Transmission and Distribution, vol. 142, No. 2, Mar. 1, 1995, pp. 202–210, Ekanavake J., et al., "Experimental Investigation of an Advanced Static Var Compensator".

Conference Record Of The Industry Applications Conference IAS Annual Meeting, Toronto, Oct. 3–8, 1993, Institute of Electrical and Electronics Engineers, pp. 901–908, Choi N.S., et al., "Modeling And Analysis of a Static Var Compensator Using Multilevel Voltage Source Inverter".

Primary Examiner—Adolf Berhane
Attorney, Agent, or Firm—Wolf, Greenfield & Sacks, P.C.

[57] ABSTRACT

The present invention relates to a device for improving the power factor of a rectifying bridge supplied by an a.c. voltage and meant to issue a rectified d.c. supply, including two capacitors mounted in series and having different values, a first charge path essentially meant for a first capacitor, a second switchable charge path and exclusively meant for a second capacitor with a value higher than the value of the first capacitor, a first switchable discharge path and essentially meant for the first capacitor, and a second discharge path exclusively meant for the second capacitor.

37 Claims, 1 Drawing Sheet

DOUBLE DISCHARGE CIRCUIT FOR IMPROVING THE POWER FACTOR

BACKGROUND OF THE INVENTION

1. Field of the Invention

The present invention relates to the field of rectified power supplies obtained from an a.c. voltage, for example, the mains a.c. voltage, and is meant in particular for a switch-mode supply system.

2. Discussion of the Related Art

A rectifier is generally comprised of a diode bridge connected to an a.c. supply and a storage capacitor, positioned between output terminals of the rectifier, which is provided with a rectified d.c. supply. The rectified d.c. supply is, for example, meant for a power converter such as a switch-mode supply.

Conventional rectifiers are generally associated with circuits for compensating or improving the power factor, which are notably meant for widening the current pulse pumped from the mains for each mains halfwave.

Among existing solutions for correcting the power factor, a circuit using an inductance and a diode mounted in series between a rectified supply terminal and a first terminal of the capacitor is known. A terminal of a switch is connected between the inductance and the diode, and the other terminal is grounded. A processor controls the switch appropriately according to the detected voltage and current. Such a device, for example available by SGS-Thomson Microelectronics under reference L6560, enables the attainment of a next-to-perfect correction of the power factor, that is, the charging current of the storage capacitor takes the shape of a sine wave in phase with the voltage sine wave. A disadvantage of such a circuit for compensating the power factor, however, is that it includes a non-integrable and costly inductance.

Other circuits for compensating the power factor based on diodes and resistors are also known, but these circuits entail significant losses in the resistors, which is prejudicial to the efficiency of the converter.

SUMMARY OF THE INVENTION

The present invention aims at providing a device for improving the power factor which can be made entirely from semiconductor components.

According to a first aspect, the present invention provides a device which has a particularly simple and inexpensive structure.

The present invention also aims at having the minimum voltage issued to the load as high as possible for a given a.c. supply voltage.

According to a second aspect, the present invention provides a device for improving the power factor which can be implemented as an integrated circuit by minimizing the silicon surface required for the circuit.

To achieve these objects, the present invention provides a device for improving the power factor of a rectifying bridge supplied by an a.c. voltage and meant to issue a rectified d.c. supply, including two capacitors mounted in series and having different values, a first charge path essentially meant for a first capacitor, a second charge path which is switchable and exclusively meant for a second capacitor with a value higher than the value of the first capacitor, a first discharge path which is switchable and essentially meant for the first capacitor, and a second discharge path exclusively meant for the second capacitor.

According to an embodiment of the present invention, the closing of the second charge path is synchronized with the transition through a maximum of the a.c. supply voltage.

According to an embodiment of the present invention, the device for improving the power factor includes a control block for switching the first discharge path to the conductive state, only after the transition through a maximum of the a.c. supply voltage.

According to an embodiment of the present invention, the first discharge path includes a first switch interposed between the first capacitor and a rectified supply line constituting a reference potential.

According to an embodiment of the present invention, the second charge path includes a current limiting device in series with a second switch, between the midpoint of the series association of the capacitors and the reference line.

According to an embodiment of the present invention, the second switch is controllable to be turned on and off.

According to an embodiment of the present invention, the first charge path includes a first diode in parallel with the first switch, the second discharge path including a second diode mounted between the midpoint between the two capacitors and the reference line.

According to an embodiment of the present invention, the second diode is a Zener diode.

According to an embodiment of the present invention, the switches, the diodes and the current limiting device are formed within a same integrated circuit.

According to an embodiment of the present invention, the first capacitor is a low-voltage capacitor.

According to another embodiment of the invention, a circuit for improving the power factor of a rectifying bridge (which is configured to receive an a.c. voltage and to issue a d.c. supply between a pair of rectifier supply lines) comprises first and second capacitors, two charge paths for the capacitors and two discharge paths for the capacitors. The first and second capacitors are coupled in series and are adapted to be coupled between the pair of rectifier supply lines, the second capacitor having a larger capacitance than the first. The first charge path is arranged to charge the first capacitor more than the second capacitor during a first time interval. The second charge path is arranged to charge only the second capacitor during a second time interval that is at least partially non-overlapping with the first time interval. The first discharge path is arranged to discharge the first capacitor more than the second capacitor during a third time interval that is at least partially non-overlapping with the first and second time intervals. The second discharge path is arranged to discharge only the second capacitor during a fourth time interval that is at least partially non-overlapping with the first, second and third time intervals.

According to another aspect, the circuit further comprises a control circuit that controls first and second switching devices. The first switching device is included in one of the first and second charge paths, and the second switching device is included in one of the first and second discharge paths.

According to an another embodiment of the invention, a d.c. supply circuit includes a rectifier bridge, first and second capacitors, two charge paths for the capacitors, and two discharge paths for the capacitors. The rectifier bridge is configured to receive an a.c. voltage and to issue a rectified d.c. supply between first and second rectifier supply lines. The first and second capacitors are coupled in series between the first and second rectifier supply lines, the second capacitor having a larger capacitance than the first capacitor. The first charge path is arranged to charge the first capacitor more than the second capacitor during a first time interval. The second charge path arranged to charge only the second capacitor during a second time interval that is at least partially non-overlapping with the first time interval. The first discharge path arranged to discharge the first capacitor more than the second capacitor during a third time interval that is at least partially non-overlapping with the first and second time intervals. The second discharge path arranged to discharge only the second capacitor during a fourth time interval that is at least partially non-overlapping with the first, second and third time intervals.

According to yet another embodiment of the invention, a circuit for improving the power factor of a rectifying bridge (which is configured to receive an a.c. voltage and to issue a d.c. supply between first and second rectifier supply lines) comprises first and second capacitors, two means for establishing charge paths for the capacitors, and two means for establishing discharge paths for the capacitors. The first and second capacitors are coupled in series and are adapted to be coupled between the first and second rectifier supply lines, the second capacitor having a larger capacitance than the first capacitor. The two means for establishing charge paths include: (a) means for establishing a first charge path to charge the first capacitor more than the second capacitor, and (b) means for establishing a second charge path to charge only the second capacitor. The two means for establishing discharge paths include: (a) means for establishing a first discharge path to discharge the first capacitor more than the second capacitor, and (b) means for establishing a second discharge path to discharge only the second capacitor.

According to an additional aspect of the invention, a method for improving the power factor of a rectifying bridge (which is configured to receive an a.c. voltage and to issue a d.c. supply between first and second rectifier supply lines), comprises the steps of: (a) coupling first and second capacitors in series between the first and second rectifier supply lines, the second capacitor having a larger capacitance than the first capacitor, (b) establishing a first charge path to charge the first capacitor more than the second capacitor, (c) establishing a second charge path to charge only the second capacitor, (d) establishing a first discharge path to discharge the first capacitor more than the second capacitor, and (e) establishing a second discharge path to discharge only the second capacitor.

These objects, characteristics and advantages as well as others, of the present invention, will be discussed in detail in the following non-limiting description of a specific embodiment in relation with the accompanying drawings.

DETAILED DESCRIPTION

Figure 2:
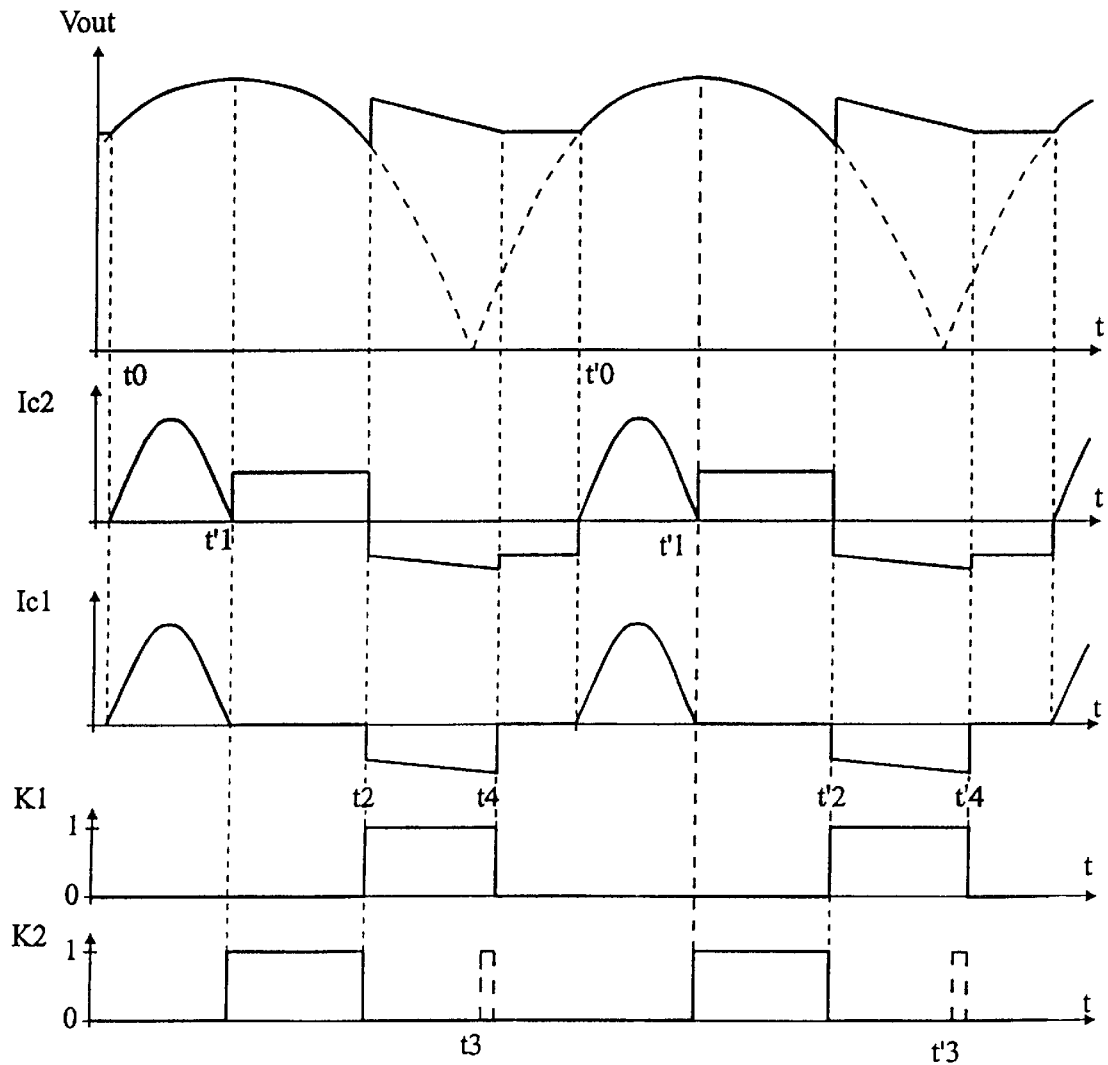
FIG. 2 illustrates, in the form of timing diagrams, the operation of a device such as that shown in FIG. 1.

For clarity, the timing diagrams of FIG. 2 are not to scale.

A device for improving the power factor according to the present invention includes two storage capacitors C1 and C2 downstream of a conventional rectifying bridge 1, for example, a diode bridge. Bridge 1 is connected to two terminals E1 and E2 of an a.c. supply, for example the a.c. supply voltage. A rectified d.c. supply Vout is issued on positive and negative output terminals A and G, respectively, terminal G generally constituting a ground terminal.

According to the present invention, the two capacitors C1 and C2 are mounted in series and charge and discharge paths are defined for these capacitors between lines A and G.

A characteristic of the present invention is that the two capacitors C1 and C2 have different values, capacitor C2 having a value higher than that of capacitor C1. A first terminal of capacitor C2 is connected to line A. A first terminal of capacitor C1 is connected to the anode of a diode D1, the cathode of which is connected to line G. A switch K1 is mounted in parallel with diode D1. The second terminals of capacitors C1 and C2 are connected to a point B.

A current limiting device, preferably a current generator 2, in series with a switch K2, is connected between point B and line G. A diode D2 is also connected between point B and line G.

According to the present invention, diode D1 defines a first charge path, essentially meant for capacitor C1, whereas current generator 2 and switch K2 define a second switchable charge path, exclusively meant for capacitor C2. Switch K1 defines a first switchable discharge path, essentially meant for capacitor C1, whereas diode D2 defines a second discharge path, exclusively meant for capacitor C2.

Switches K1 and K2 are controlled individually by means of an adapted control circuit 3, supplied by a low d.c. voltage Vcc.

The rectified d.c. supply Vout is meant for a load (not shown), for example a power converter such as a switch-mode supply system.

Figure 1:
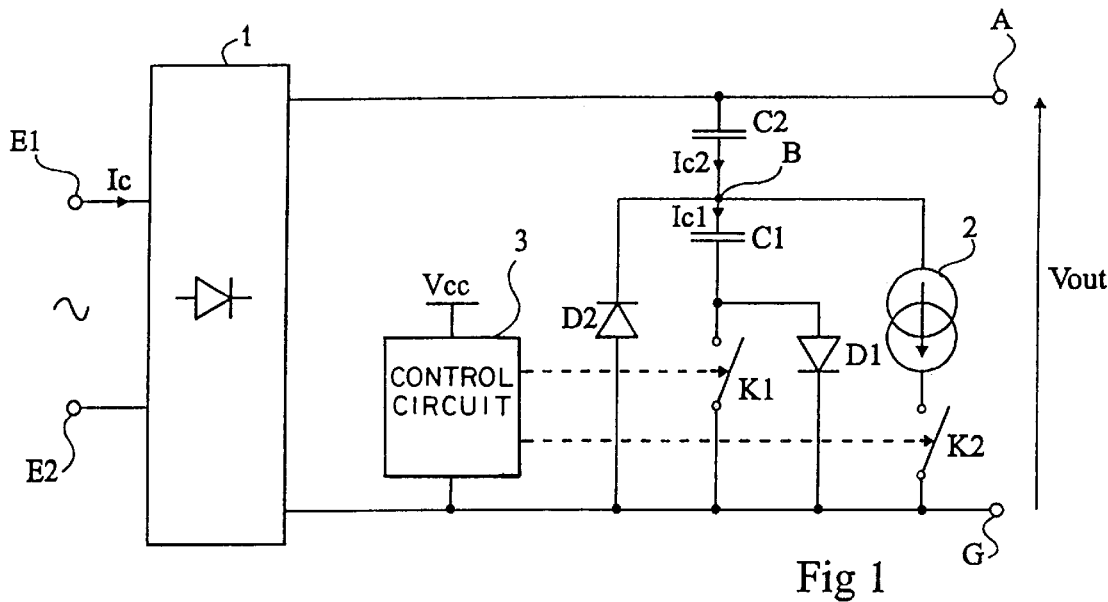
FIG. 1 shows an embodiment of a device for improving the power factor according to the present invention.

The operation of the device according to the present invention (as shown in FIG. 1) is illustrated in FIG. 2. FIG. 2 shows, in the form of timing diagrams, voltage Vout across the load, currents IC1 and IC2 through capacitors C1 and C2 and the respective "on"-periods of switches K1 and K2. The on-periods of switches K1 and K2 are shown by a state "1" when the switch is on and by a state "0" when it is off.

Consider, in steady-state, a time t0 when the rectified a.c. voltage (shown in dotted lines in FIG. 2) becomes higher than the charge of capacitor C2. It is assumed that before this time t0, switches K1 and K2 are off and capacitor C2 supplies the load while capacitor C1 is completely discharged. Starting from time t0, the load is supplied by the mains while a charging current starts to flow through the first charge path, that is, through capacitors C1, C2 and diode D1. Capacitor C1 charges completely. Capacitor C2 also begins charging, but much slower. Indeed, due to the difference of values between capacitors C1 and C2, capacitor C1 charges much faster than capacitor C2. It can be estimated that the voltage across capacitor C2 remains essentially constant. Thus, the current Ic drawn from the supply evolves according to a C·dV/dt function, where dV/dt follows the course of the rectified a.c. voltage and where C corresponds to the series association of capacitors C1 and C2. It can thus be considered that current Ic essentially corresponds to the charging current of capacitor C1.

When the halfwave of the rectified a.c. voltage reaches its maximum (time t1), block 3 controls the turning-on of switch K2 to activate the second charge path. Starting from time t1, capacitor C1 remains loaded due to the reverse-biasing of diode D1, whereas capacitor C2 completes its charge under a constant current set by current limiting device 2. Current Ic thus is substantially constant during this period and corresponds to the level set by device 2.

As an alternative, not shown, device 2 can be replaced by a resistor.

At a time t2, block 3 turns off switch K2 and turns on switch K1. In practice, the turning-on of switch K1 is slightly delayed with respect to the turning-off of switch K2. The load is then supplied by the capacitors. However, due to the differences of values between capacitors C1 and C2, capacitor C2 only slightly discharges, whereas capacitor C1 supplies most of the load supply.

Once capacitor C1 is completely discharged, diode D2 conducts, at a time t4, which activates the second discharge path by means of which the sole capacitor C2 supplies the load. Block 3 then turns off switch K1 in order to avoid the negative charging of capacitor C1 through the load connected to terminals A and G.

Should the case arise, it can be provided that at a time t3, slightly before time t4, switch K2 is turned on to guarantee a complete discharge of capacitor C1 via device 2 and switch K2. In this case, at time t4, the two switches K1 and K2 are simultaneously turned off. The "on" time period of switch K2 between times t3 and t4 is shown in dotted lines in FIG. 2.

At a time t'0 when the rectified a.c. voltage becomes higher than the charge of capacitor C2, the operation discussed hereabove for times t0 to t4 is repeated for times t'0 to t'4.

An advantage of the present invention is that the potential of point B between capacitors C1 and C2 always remains at a low potential with respect to the maximum amplitude of the rectified a.c. voltage. For example, for a mains voltage of 220 volts, the potential of point B remains lower than 100 volts.

Thus, a low voltage capacitor can be used as capacitor C1, which is less expensive. Moreover, even if during the discharge of capacitor C1, the effective current is important, the power loss is low since capacitor C1 has a low series resistance. Similarly, switches K1 and K2 only see a limited voltage across their main terminals.

Another advantage of the present invention is that the minimum voltage which can be issued to the load under a given a.c. voltage amplitude is not reduced by the addition of resistors in series with the capacitors, in particular in the first charge path. Thus, resistive losses are minimized.

It should however be noted that, in some applications, it can be desirable to limit the surge during the charge of capacitor C2. For this purpose, an external conventional circuit can be used.

It should also be noted that point B can easily be used as a basis for a circuit supplying voltage Vcc.

Another advantage of the present invention is that, if the a.c. supply disappears, for example during a mains failure, diode D2 enables capacitor C2 to automatically start supplying the load.

The control of switches K1 and K2 can be implemented by any conventional means, as long as it is synchronized with the mains and provides for the on-cycles described hereabove.

Switch K1 is, for example, implemented by means of a thyristor, a MOS transistor or a gate turn-off thyristor. Switch K2 is, for example, implemented by means of a MOS transistor or a gate turn-off thyristor. It should be noted that, in the case of switch K2, a thyristor cannot be used (unless it can be turned off by its gate) since switch K2 must be able to be turned on at time t2 (and possibly at time t3).

It should also be noted that in the case (not shown) where switch K2 is implemented by means of a MOS transistor, the transistor can also be used as a current limiting device 2 by providing a current regulation within the MOS transistor by means of a bipolar transistor and a resistance between the source and the gate of an N-channel MOS transistor.

The device for improving the power factor according to the present invention is particularly well adapted to having its components integrated. Indeed, all the semiconductor components (diodes D1 and D2, switches K1 and K2 and device 2) have a common grounded terminal. Moreover, since the potential of point B remains limited, the device is implementable in low-voltage technologies. Thus, the conduction losses are minimized and the integration is easier and less expensive than in the case where the components have to bear high voltages.

As an alternative, not shown, diode D2 can be replaced with a Zener diode, which protects the circuit in case of an overvoltage.

Of course, the present invention is likely to have various alterations, modifications, and improvements which will readily occur to those skilled in the art. In particular, each of the described components can be replaced with one or several components performing the same function. Similarly, the sizing of the different components, in particular that of capacitors C1 and C2, is within the abilities of those skilled in the art according to the functional indications given hereabove and to the application for which the device for improving the power factor is meant.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for improving the power factor of a rectifying bridge supplied by an AC voltage and meant to issue a rectified DC supply to a load coupled between first and second supply lines, including:

first and second capacitors mounted in series between the first and second supply lines, the second capacitor having a larger capacitance than the first capacitor;

a first charge path extending between the first and second supply lines to charge essentially the first capacitor;

a second charge path, which is switchable, extending between the first and second lines to charge exclusively the second capacitor;

a first discharge path, which is switchable, extending between the first and second supply lines to discharge essentially the first capacitor to the load; and a second discharge path extending between the first and second supply lines to discharge exclusively the second capacitor to the load.

2. The device for improving the power factor according to claim 1, wherein a turning on of the second charge path is synchronized with a transition through a maximum of the a.c. voltage.

3. The device for improving the power factor according to claim 2, including a control block for switching the first discharge path to a conductive state only after the transition through the maximum of the a.c. voltage.

4. The device for improving the power factor according to claim 1, wherein the first discharge path includes a first switch interposed between the first capacitor and a rectified supply line constituting a reference potential.

5. The device for improving the power factor according to claim 4, wherein the second charge path includes a current limiting device in series with a second switch and is coupled between a junction point of the first and second capacitors and the rectified supply line constituting the reference potential.

6. The device for improving the power factor according to claim 5, wherein the second switch is controllable to be turned on and off.

7. The device for improving the power factor according to claim 4, wherein the first charge path includes a first diode in parallel with the first switch.

8. The device for improving the power factor according to claim 7, wherein the first diode and the first switch are implemented within a same integrated circuit.

9. The device for improving the power factor according to claim 5, wherein the current limiting device and the first and second switches are implemented within a same integrated circuit.

10. The device for improving the power factor according to claim 1, wherein the first capacitor is a low-voltage capacitor.

11. The device for improving the power factor according to claim 5, wherein the first charge path includes a first diode in parallel with the first switch, and the second discharge path includes a second diode coupled between the junction point of the first and second capacitors and the rectified supply line constituting the reference potential.

12. The device for improving the power factor according to claim 11, wherein the second diode comprises a zener diode.

13. The device for improving the power factor according to claim 11, wherein the first and second switches, the first and second diodes, and the current limiting device are implemented within a same integrated circuit.

14. A circuit for improving the power factor of a rectifying bridge, the rectifying bridge being configured to receive an AC voltage and to issue a DC supply to a load coupled between first and second rectifier supply lines, comprising:
   first and second capacitors coupled in series between the first and second rectifier supply lines;
   a first charge path extending between the first and second supply lines to charge the first capacitor more than the second capacitor during a first time interval;
   a second charge path extending between the first and second supply lines to charge the second capacitor more than the first capacitor during a second time interval that is at least partially non-overlapping with the first time interval;
   a first discharge path extending between the first and second supply lines to discharge the first capacitor to the load more than the second capacitor is discharged to the load during a third time interval that is at least partially non-overlapping with the first and second time intervals; and
   a second discharge path extending between the first and second supply lines to discharge the second capacitor to the load more than the first capacitor is discharged to the load during a fourth time interval that is at least partially non-overlapping with the first, second and third time intervals.

15. The circuit for improving the power factor as claimed in claim 14, wherein the first and second charge paths are configured and controlled such that the second time interval sequentially follows the first time interval.

16. The circuit for improving the power factor as claimed in claim 15, wherein the first and second discharge paths are configured and controlled such that the fourth time interval sequentially follows the third time interval.

17. The circuit for improving the power factor as claimed in claim 16, wherein the second charge path and the first discharge path are configured and controlled such that the third time interval sequentially follows the second time interval.

18. The circuit for improving the power factor as claimed in claim 14, wherein the second charge path is arranged to discharge the first capacitor during a fifth time interval that is included within the third time interval.

19. The circuit for improving the power factor as claimed in claim 14, further comprising a control circuit, and wherein one of the first and second charge paths includes a first switching device that is selectively controlled by the control circuit, and one of the first and second discharge paths includes a second switching device that is selectively controlled by the control circuit.

20. The circuit for improving the power factor as claimed in claim 14, wherein at least one of the first charge path, the second charge path, the first discharge path, and the second discharge path comprises a diode.

21. The circuit for improving the power factor as claimed in claim 14, wherein one of the first and second charge paths includes a first diode and one of the first and second discharge paths includes a second diode.

22. The circuit as claimed in claim 14, wherein the second capacitor has a larger capacitance than the first capacitor.

23. The circuit as claimed in claim 14, wherein the second charge path is arranged to charge only the second capacitor during the second time interval.

24. The circuit as claimed in claim 14, wherein the second discharge path is arranged to discharge only the second capacitor during the fourth time interval.

25. A circuit for issuing a DC supply to a load, comprising:
   first and second rectifier supply lines;
   a rectifier bridge configured to receive an AC voltage and to issue a rectified DC supply between the first and second rectifier supply lines;
   first and second capacitors coupled in series between the first and second rectifier supply lines;
   a first charge path extending between the first and second supply lines to charge the first capacitor more than the second capacitor during a first time interval;
   a second charge path extending between the first and second supply lines to charge the second capacitor more than the first capacitor during a second time interval that is at least partially non-overlapping with the first time interval;
   a first discharge path extending between the first and second supply lines to discharge the first capacitor to the load more than the second capacitor is discharged to the load during a third time interval that is at least partially non-overlapping with the first and second time intervals; and
   a second discharge path extending between the first and second supply lines to discharge the second capacitor to the load more than the first capacitor is discharged to the load during a fourth time interval that is at least partially non-overlapping with the first, second and third time intervals.

26. The circuit as claimed in claim 25, wherein the second capacitor has a larger capacitance than the first capacitor.

27. The circuit as claimed in claim 25, wherein the second charge path is arranged to charge only the second capacitor during the second time interval.

28. The circuit as claimed in claim 25, wherein the second discharge path is arranged to discharge only the second capacitor during the fourth time interval.

29. A circuit for improving the power factor of a rectifying bridge, the rectifying bridge being configured to receive an AC voltage and to issue a DC supply to a load coupled between first and second rectifier supply lines, comprising:

first and second capacitors coupled in series between the first and second rectifier supply lines;

means for establishing a first charge path between the first and second supply lines to charge the first capacitor more than the second capacitor;

means for establishing a second charge path between the first and second supply lines to charge the second capacitor more than the first capacitor;

means for establishing a first discharge path between the first and second supply lines to discharge the first capacitor to the load more than the second capacitor is discharged to the load; and means for establishing a second discharge path between the first and second supply lines to discharge the second capacitor to the load more than the first capacitor is discharged to the load.

30. The circuit as claimed in claim 29, wherein the second capacitor has a larger capacitance than the first capacitor.

31. The circuit as claimed in claim 29, wherein the means for establishing the second charge path includes means for establishing the second charge path so as to charge only the second capacitor.

32. The circuit as claimed in claim 29, wherein the means for establishing the second discharge path includes means for establishing the second discharge path so as to discharge only the second capacitor to the load.

33. A method for improving the power factor of a rectifying bridge, the rectifying bridge being configured to receive an AC voltage and to issue a DC supply to a load coupled between first and second rectifier supply lines, comprising the steps of:

coupling first and second capacitors in series between the first and second rectifier supply lines;

establishing a first charge path between the first and second supply lines to charge the first capacitor more than the second capacitor;

establishing a second charge path between the first and second supply lines to charge the second capacitor more than the first capacitor;

establishing a first discharge path between the first and second supply lines to discharge the first capacitor to the load more than the second capacitor is discharged to the load; and establishing a second discharge path between the first and second supply lines to discharge the second capacitor to the load more than the first capacitor is discharged to the load.

34. The method according to claim 33 wherein the steps of establishing the first charge path, establishing the second charge path, establishing the first discharge path, and establishing the second discharge path are performed in the order recited therein.

35. The method as claimed in claim 33, wherein the second capacitor has a larger capacitance than the first capacitor.

36. The method as claimed in claim 33, wherein the step of establishing the second charge path includes establishing the second charge path so as to charge only the second capacitor.

37. The method as claimed in claim 33, wherein the step of establishing the second discharge path includes establishing the second discharge path so as to discharge only the second capacitor to the load.

* * * * *